United States Patent
Ko et al.

(10) Patent No.: US 7,613,542 B2
(45) Date of Patent: Nov. 3, 2009

(54) REFERENCE-BASED AUTOMATIC ADDRESS ASSIGNMENT SYSTEM AND METHOD FOR A MATERIAL HANDLING SYSTEM

(75) Inventors: Clyde Miin-Arng Ko, Ada, MI (US); Randall J. Carlson, Grand Rapids, MI (US); Roger L. Sinen, Grand Rapids, MI (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 585 days.

(21) Appl. No.: 11/308,351

(22) Filed: Mar. 17, 2006

(65) Prior Publication Data
US 2006/0212163 A1 Sep. 21, 2006

Related U.S. Application Data

(60) Provisional application No. 60/663,032, filed on Mar. 18, 2005.

(51) Int. Cl.
*G06F 7/00* (2006.01)
*G06F 19/00* (2006.01)
*B65G 43/08* (2006.01)

(52) U.S. Cl. ................. 700/230; 198/572; 700/112

(58) Field of Classification Search ............. 700/230, 700/213, 228, 229, 112; 198/358, 349, 571, 198/572, 576, 577, 783, 792, 781.05
See application file for complete search history.

(56) References Cited

U.S. PATENT DOCUMENTS

| | | | |
|---|---|---|---|
| 6,253,909 B1 * | 7/2001 | Kalm et al. | 198/781.06 |
| 6,460,683 B1 * | 10/2002 | Pfeiffer | 198/460.1 |
| 6,700,877 B1 | 3/2004 | Lorenz et al. | |
| 6,701,214 B1 * | 3/2004 | Wielebski et al. | 700/224 |
| 6,951,274 B2 | 10/2005 | Zeitler et al. | |
| 7,035,714 B2 | 4/2006 | Anderson et al. | |
| 7,228,363 B1 | 6/2007 | Wehrle et al. | |
| 2003/0168316 A1 * | 9/2003 | Knepple et al. | 198/460.1 |
| 2004/0003982 A1 * | 1/2004 | Tachibana et al. | 198/348 |
| 2004/0111339 A1 * | 6/2004 | Wehrung et al. | 705/30 |
| 2004/0195078 A1 * | 10/2004 | Anderson et al. | 198/781.05 |

FOREIGN PATENT DOCUMENTS

CH 678715 A5 10/1991

\* cited by examiner

*Primary Examiner*—Gene Crawford
*Assistant Examiner*—Ramya Prakasam

(57) ABSTRACT

A material handling system and method of automatic address assignment of components of the material handling system, includes a conveying surface divided into a plurality of zones, a plurality of motors propelling each zone, a plurality of lower level controllers and a plurality of sensors adapted to communicate the presence of an article on the conveying surface to the associated lower level controller. An upper-level controller in communication with the lower level controllers assigns a unique communications address to a specific lower level controller identified by a reference article being detected by the sensor with that lower level controller.

12 Claims, 2 Drawing Sheets

REFERENCE-BASED AUTOMATIC ADDRESS ASSIGNMENT SYSTEM AND METHOD FOR A MATERIAL HANDLING SYSTEM

CROSS-REFERENCE TO RELATED APPLICATION

This application claims priority from U.S. provisional patent application Ser. No. 60/663,032, filed on Mar. 18, 2005, the disclosure of which is hereby incorporated herein by reference in its entirety.

BACKGROUND OF THE INVENTION

The present invention relates generally to material handling systems having address-based networks, and more particularly to automatic address assignment in the material handling system network.

Conveyor systems are used in a wide variety of material handling applications. These include such things as conveying luggage throughout airports, conveying parcels through transportation terminals, conveying manufactured parts or components throughout factories, conveying inventory, sorting and conveying items to be transported, and various other applications. Such material handling systems may use conveyors having endless belts that are rotated around end rollers to cause the top surface of the belt to move in the direction of conveyance. Such material handling systems alternatively may use conveyors having a series of rollers, selected ones of which are driven to cause articles positioned on the rollers to move in the direction of conveyance. An example of one such roller conveyor is disclosed in U.S. Pat. No. 6,253,909 issued to Kalm et al., entitled MODULAR POWER ROLLER CONVEYOR, the disclosure of which is hereby incorporated herein by reference. Still other types of conveyors may use movable slats to transport articles, as well as other structures.

The installation and commissioning of prior material handling systems is a time consuming labor-intensive process. The design and installation of prior material handling systems has often involved a great deal of custom engineering of the system in order to make the system match the physical layout of the customer's site, as well as match the conveying needs of the customer. Such custom engineering not only includes the physical aspects of the individual conveyors making up the system, but also the programming and control logic that is used to control the overall system.

The assignment of addresses to devices of the network is currently a labor intensive means. A conventional system may utilize physically setting the addresses of each device, for example, with a dip switch. The process becomes time consuming and cumbersome with material handling systems that have a greater number of components and devices or are physically larger and more complex.

Reducing material costs, the amount of time and labor involved in these tasks is highly desirable.

DETAILED DESCRIPTION OF THE PREFERRED EMBODIMENT

Figure 1:
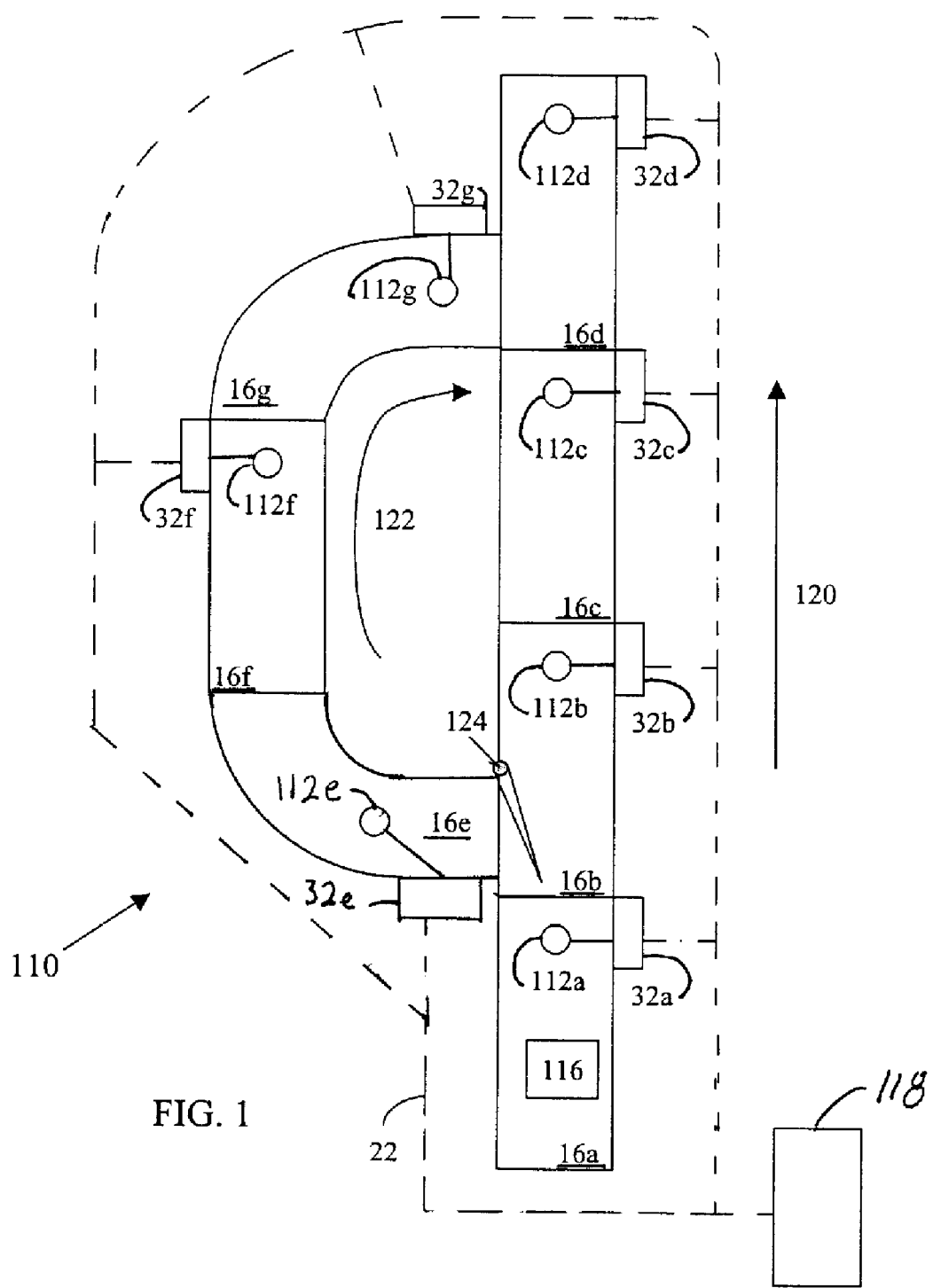
FIG. 1 is a block diagram showing a material handling system.

Referring now to the drawings and the illustrative embodiments depicted therein, a material handling system 110 illustrates the assignment of communication addresses to lower level, or slave, controllers 32a-32g from an upper level, or master, controller 118 over an address-based network. The upper level controller may be an inventory management control and the lower level controllers may be bed level controllers, such as disclosed in commonly assigned patent application Ser. No. 10/764,962, filed Jan. 26, 2004 (claiming priority from U.S. application Ser. No. 60/442,311, filed on Jan. 24, 2003) by Siemens, for an INTEGRATED CONVEYOR BED, and published PCT Application No. WO2003PO2881 for an INTEGRATED CONVEYOR BED, filed on Jan. 24, 2003, the disclosures of which are hereby incorporated herein (FIG. 1). Network 22 may be wired, optical or wireless, such as radio frequency, infrared, or the like. Alternatively, the upper level controller may be a conveyor bed level controller and the lower level controllers may include brushless motor controllers, motor device controllers, and the like. Other configurations may be apparent to the skilled artisan.

Figure 2:
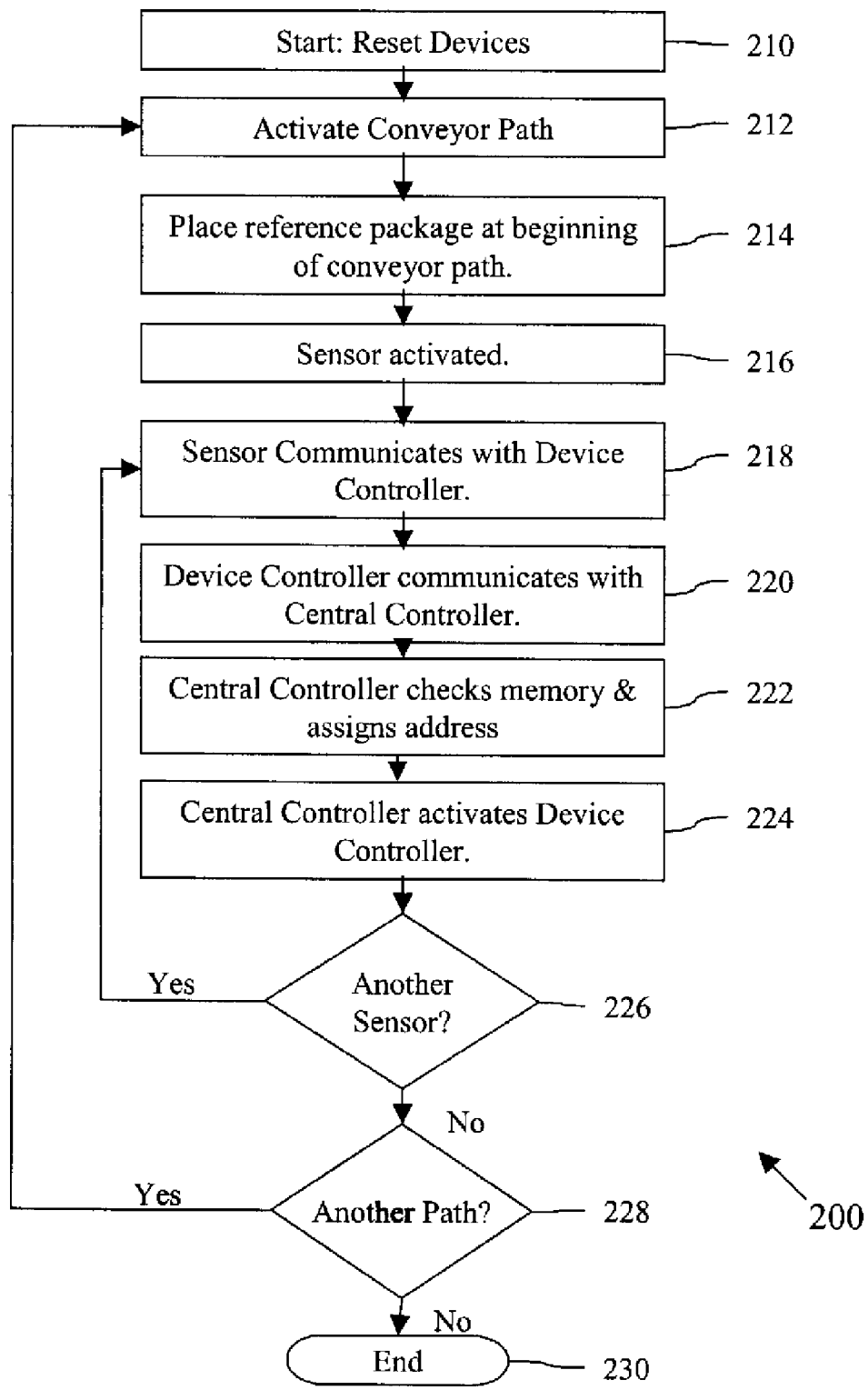
FIG. 2 is a flowchart illustrating addressing of devices of the material handling system in FIG. 1.

In order to assign communication addresses from master controller 118 to a plurality of slave controllers, such as lower level controllers 32a-32g, over an address-based network 22, only one lower level controller 32a-32g responds to a particular address sent by master controller 118. The difficulty is that, initially, none of lower level controllers 32a-32g has a unique communication address assigned to it. Moreover, it is necessary that the particular lower level controller 32 receiving an address be physically associated to the layout of conveyor system 110 in the memory of master controller 118. This may be accomplished by an automated address assignment procedure 200, diagramed in FIG. 2. Automated address assignment procedure 200 replaces the manual procedure of setting addresses, such as using dip switches, hand held computers, or the like. The process of manually setting addresses is time consuming and cumbersome, especially in material handling systems that are large and complex.

Automated address assignment procedure 200 uses a reference device 116, such as a reference package to assist auto addressing of lower level controllers 32a-32g. Lower level controllers 32a-32g communicate with upper level controller 118 over a network 22. Network 22 may be a standard and commonly available high-speed serial or parallel network, including but not limited to: Ethernet, DeviceNet, ControlNet, Firewire, CanOpen, or FieldBus. Network 22 may optionally include a bridge (not shown) translating between different of the above standard or other protocols. Automated address assignment procedure 200 uses associated sensors 112a-112g for each zone 16a-16g. Sensors 112a-112g detect the presence of an object in each zone 16a-16g associated with particular lower level controllers 32a-32g. Sensors 112a-112g may be photosensors, proximity sensors, cameras, mechanical switches, or the like. Zones 16a-16g are illustrated as a section of conveyor. Reference package 116 may be an item, or article, that will be of the type normally transported on the material handling system or a specific object dedicated for use only in address assignment. Reference package 116 is capable of detection by sensors 112a-112g when it goes through material handling system 110.

Automated address assignment procedure 200 begins with upper level central controller 118 setting all the devices, such as lower level controllers 32a-32g, on network 22 to a reset or idle state in step 210 unless the devices are already set to an idle state. The state allows the address registers of inactivated lower level controllers 32a-32g to be clear when the addressing process begins and, therefore, ready to accept an address assigned by central controller 118.

The material handling system is activated at step 212 for material handling path 120. Reference package 116 is placed at the beginning of material handling system 110 at step 214 to travel through the material handling system path 120. The process for a straight system will be discussed first. Discussion of a material handling system with multiple paths will be discussed later. However, is should be noted, the procedure may be applied to a plurality of configurations and types of material handling systems, such as a curved conveyor 122, and the like.

When reference package 116 reaches first sensor 112a, sensor 112a detects the presence of reference package 116 at step 216. The activation of first sensor 112a triggers communications with associated lower level controller 32a of the presence of reference package 116 at step 218. Associated lower level controller 32 is placed in an acceptance mode state and then informs central upper level controller 118 of the presence of reference package 116 at step 220.

Central controller 118 may have a read/write memory device where address assignments may be stored and accessed in a database or table. Central upper level controller checks the memory device for the next open address to be assigned, generally in a sequential order at 222 according to the topology of the system layout. Central controller 118 then sends out the address assignment signal to lower level controller 32a associated with activated sensor 112a, at step 222. The address assignment signal is accepted by the lower level controller 32a in the acceptance mode state as a result of reference package 116 being detected, and no other corresponding lower level controllers will respond to the address assignment. The associated lower level controller 32a is thus activated with the new address assignment.

As reference package 116 proceeds through path 120 of material handling system 110, address assignment process 200 waits for another sensor to be detected at step 226. If no sensor is activated, the process may default and move on to steps 228 and 230. Process 200 may move to step 230 with an end message that may be triggered by such events as expiration of a certain length of time, when the number of devices to be addressed has been met, or having the last device identify itself as the last device along paths 120, 122. However, if another sensor 112b is activated by detection of reference package 116, process 200 returns to step 218 and repeats for addressing of lower level controller 32b. This is repeated until all lower level controllers have addresses assigned.

The system and method may also be utilized in material handling systems with multiple alternative paths, configurations or loops. After path 120 is complete, the reference package may be placed in another path 122 to be addressed. Second path 122 may be activated by diverter 124 or any other conveying transfer or diverting device. Automated addressing assignment procedure 200 first completes addressing of first path 120 and then continues to step 228, where central upper level controller 118 inquires if another path or loop with additional devices requires addressing. If another path requires addressing at step 228, the process returns to step 212 for activation of second path 122. Paths 120 and 122 of FIG. 1 share same first device 32a, for which central controller 206 keeps the same first assigned address. As reference package 116 travels on second path 122, central controller 118 anticipates the next device to read the second assigned address after the first assigned address from path 120. However, when central controller 118 detects a new zone 16e by receiving an idle or reset state message from lower level controller 32e of path 122, process 200 determines that another path or loop exists in material handling system 110. Central controller 118 then assigns the next available address assignment to lower level controller 32e of path 122. Central controller 118 maintains the addresses of first path 120 and records the new addresses for second path 122 in the read/write memory. Process 200 then continues until lower level controllers 32f and 32g of zones 16f and 16g are addressed. In this example, when reference package 116 reaches zone 16d, central controller 118 recognizes a return to path 120 and that zone 16d is the last zone of material handling system 110.

Automated address assignment procedure 200 does not require a separate communications connection between controllers to control address assignments and, therefore, may be used in a master/slave configuration. Automated address assignment procedure 200 may provide a basic layout of the material handling system based on the relationship of addresses of lower level controllers 32a-32g, which are generally assigned in a sequential order. For example, basic layout for material handling system 110 can be obtained from the address assignments of paths 120 and 122 of FIG. 1. Path 120 is illustrated as including four material handling zones 16a-16d and address assignment of path 122 is illustrated as including three material handling zones 16e-16g where path 122 starts after first zone 16a and ending before last zone 16d, thus a basic layout can be produced showing the relationship of all zones 16-16g relative to one another. The topology of the material handling system may be discovered by using a topology detection technique with a master controller, as disclosed in commonly assigned patent application Ser. No. 60/566,470, filed Apr. 29, 2004, by Siemens, for a NETWORK TOPOLOGY DISCOVERY, the disclosure of which is hereby incorporated herein. Furthermore, the system and method of the present invention may also address material handling systems with zones with a plurality of devices in each zone.

An embodiment of the invention provides a method and system for addressing devices on a network, which is simpler and automatic with a reduction in time and labor. Changes and modifications in the specifically described embodiment can be carried out without departing from the principles of the invention which is intended to be limited only by the scope of the appended claims, as interpreted according to the principles of patent law.

What is claimed is:

1. A method for automatic address assignment in a material handling system having a conveying surface divided into a plurality of zones, a plurality of motors each propelling a zone of the conveying surface, a plurality of lower level controllers, a plurality of sensors, each adapted to identify the presence of an article on said conveying surface to an associated lower level controller and an upper level controller in communication with said lower level controllers over a network, the method comprising:

transporting a reference package on the conveying surface of the material handling system;

detecting the presence of the reference package with at least one sensor as the package travels along the conveying surface of the material handling system;

sending a detection signal from the at least one sensor to an associated lower level controller as the package is detected by the at least one sensor;

sending a notification signal from said lower lever controller to said upper level controller in response to receiving said detection signal;

in response to said notification signal, determining a unique communication address to be assigned to said lower level controller; and sending from said upper level controller a unique communication address assignment over the network to said lower level controller, said lower level controller assigning itself the unique communication address in response to said unique communication address assignment.

2. The method for automatic address assignment in a material handling system of claim 1, the method further comprising:
transmitting a reset message to the plurality of lower level controllers by said upper level controller;
receiving the transmitted reset message by the plurality of lower level controllers; and
resetting the address assignment of the plurality of lower level controllers.

3. The method for automatic address assignment in a material handling system of claim 1, the method further comprising:
storing the unique communication address assignment in a read/write memory of the lower level controller.

4. The method for automatic address assignment in a material handling system of claim 1, the method further comprising:
storing a plurality of unique communication address assignments of the lower level controllers in a read/write memory of the upper level controller.

5. The method according to claim 1 further comprising:
sending unique communication address assignments from said upper level controller to all the lower level controllers of all paths of the conveying surface.

6. The method according to claim 1, further comprising:
assigning addresses to the lower level controllers in one of an ascending and descending sequences.

7. The method according to claim 5, further comprising:
generating an address assignment topology map of the lower level controllers in the material handling system.

8. The method according to claim 1 wherein said lower level controllers comprise motor controllers and said upper level controller comprises a conveyor bed controller.

9. The method according to claim 1 wherein said lower level controllers comprise conveyor bed controllers.

10. The method of claim 1 further comprising:
detecting the presence of the reference package along a complete path with a plurality of additional sensors;
sending a plurality of additional detection signals to a plurality of additional lower lever controllers from said plurality of additional sensors;
sending a plurality of notification signals from said plurality of additional lower level controller to said upper level controller in response to said plurality of additional detection signals; and
in response to said plurality of notification signals, sending from said upper level controller a plurality of unique communication address assignments over the network to said plurality of additional lower level controllers.

11. The method of claim 10 further comprising:
transporting said reference package down a path at least partially different from said complete path; and
sending unique communication address assignments from said upper level controller over the network to a plurality of the lower level controllers on said at least partially different path.

12. The method according to claim 10, further comprising:
generating an address assignment topology map of the lower level controllers in the material handling system.

* * * * *

UNITED STATES PATENT AND TRADEMARK OFFICE
CERTIFICATE OF CORRECTION

PATENT NO. : 7,613,542 B2  Page 1 of 1
APPLICATION NO. : 11/308351
DATED : November 3, 2009
INVENTOR(S) : Ko et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 816 days.

Signed and Sealed this

Nineteenth Day of October, 2010

David J. Kappos
*Director of the United States Patent and Trademark Office*